(No Model.)
J. E. LOWDER.
SEED PLANTER.
No. 273,748. Patented Mar. 13, 1883.
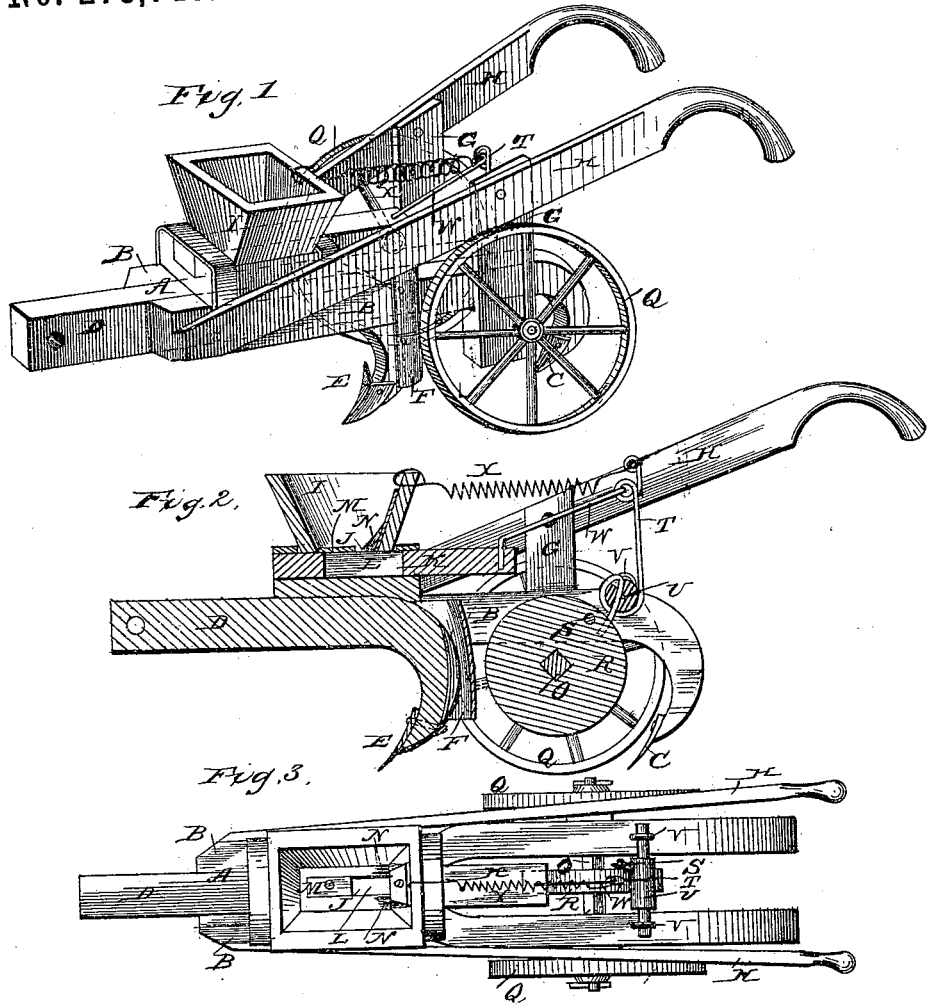
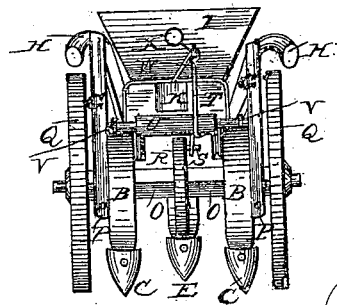
WITNESSES:
INVENTOR.
John E Lowder
by C. A. Snow & Co.
ATTORNEYS.

UNITED STATES PATENT OFFICE.

JOHN E. LOWDER, OF BOONSVILLE, TEXAS.

SEED-PLANTER.

SPECIFICATION forming part of Letters Patent No. 273,748, dated March 13, 1883.

Application filed June 14, 1882. (No model.)

*To all whom it may concern:*

Be it known that I, JOHN E. LOWDER, of Boonsville, in the county of Wise and State of Texas, have invented certain new and useful Improvements in Seed-Planters; and I do hereby declare that the following is a full, clear, and exact description of the invention, which will enable others skilled in the art to which it appertains to make and use the same, reference being had to the accompanying drawings, which form a part of this specification.

This invention relates to machines for dropping or planting cotton, corn, or other seed, and has for its object to provide a device embodying simplicity, convenience, cheapness, and efficiency. To this end it consists in certain improvements in the construction and operation of the same.

In the drawings, Figure 1 is a perspective view of my improved planter; Fig. 2, a vertical longitudinal sectional view; Fig. 3, a top view, and Fig. 4 a rear view.

Referring by letter to the drawings, A designates the frame of the machine, comprising the two longitudinal beams B B, having cultivators C C at their rear ends, and a drag beam or shaft, D, secured between their forward ends, the beam D being also provided at its rear end with a cultivator, E, having a seed tube or guide, F.

G G are two uprights or standards secured to the sides of the beams B B near their rear ends, and having secured to their tops the handles H H, the forward ends of the latter being fixed to the beams B B, as shown.

I is the hopper, which is mounted on the frame of the machine in front of the cultivator E, and is provided in its bottom with a longitudinal groove, J, in which works a horizontal slide, K, having an opening or slot, L, the size of which is regulated by an adjustable plate, M, extending over the same.

Inside the hopper, at its rear end, are arranged suitable brushes, N N, to prevent the seed from clogging and thereby interfering with the operation of the slide.

O designates the supporting-axle of the machine, which rotates in bearings P P in the lower ends of standards G G, and has fixed to its outer ends the drive-wheels Q Q.

R is an operating-wheel fixed on the axle O, between the beams B B, and provided with lateral pins or studs S, adapted to engage the lower end of an upward lever, T, having its fulcrum on a transverse shaft, U, journaled in bearings V V in or on the beams B B.

W is a connecting-arm extending from the top of lever T to the rear end of the slide K, and X is a coiled spring, secured at one end to the top of lever T and at its other end to the hopper I.

The operation and advantages of my invention will be readily understood. When the machine is started and the axle revolves, the pins S of wheel R engage the end of lever T, causing the shaft U to turn and the seed-slide K to be drawn toward the rear of the machine. When the pin S has passed, the spring X serves to draw the shaft U, lever T, and seed-slide to their normal position. In this manner the latter is intermittently reciprocated. The seed fills the opening L in the slide K, and when the latter is reciprocated passes down the tube F to the ground in the furrow made by cultivator E, and is covered by the cultivators C C.

I claim and desire to secure by Letters Patent—

As an improvement in seed-planters, the combination of the beams B B, between which rotates the rotary engaging-disk R, and formed or provided with bearings V V, rock-shaft U, journaled on beams B B in rear of disk R, operating-rod T, formed of a single piece wound around the rock-shaft, and formed with a downwardly-extending curved arm passing through the latter, upright main portion, connecting-rod W, secured to lever T near the top thereof, and the spring X, secured above arm or rod W, as set forth.

In testimony that I claim the foregoing as my own I have hereto affixed my signature in presence of two witnesses.

JOHN ELLIS + LOWDER.
his mark.

Witnesses:
JOHN H. ETTER,
WILLIAM S. HOLLEY.